March 31, 1953  R. F. WILD  2,633,558
ELECTRONIC MOTOR CONTROL APPARATUS
Filed Aug. 31, 1948
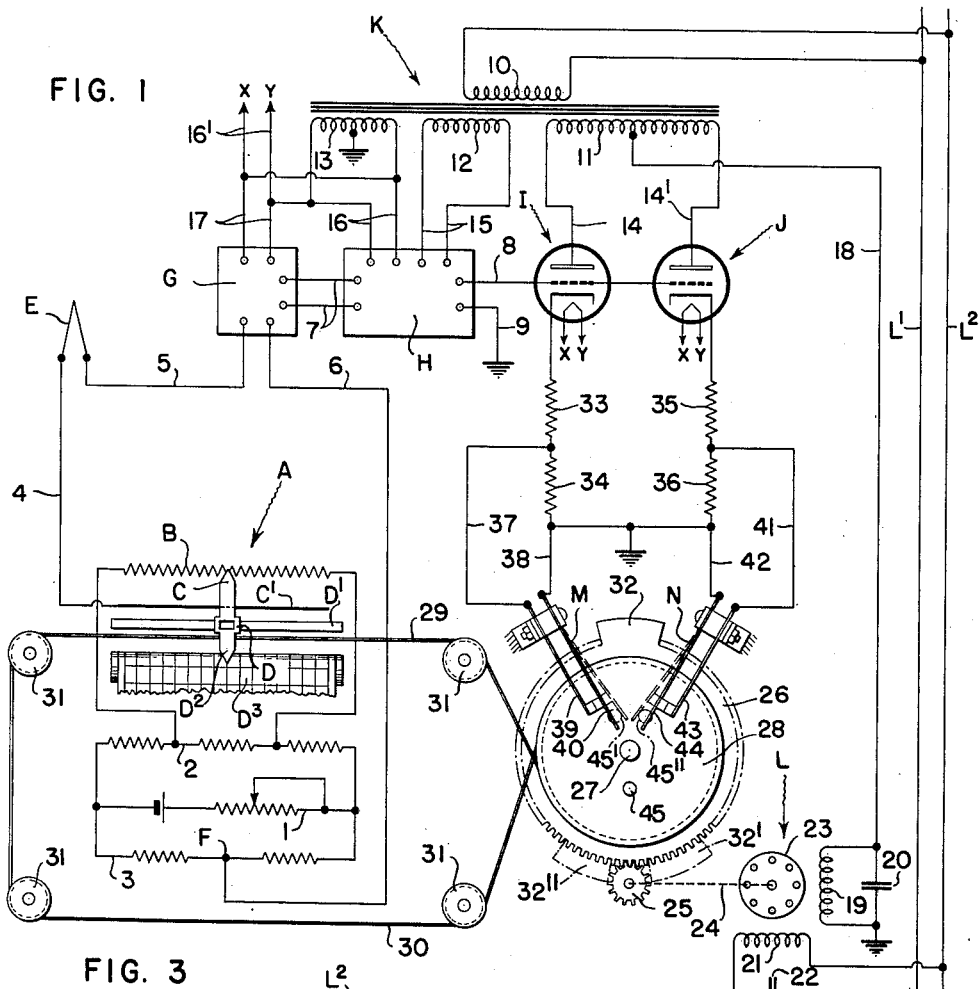
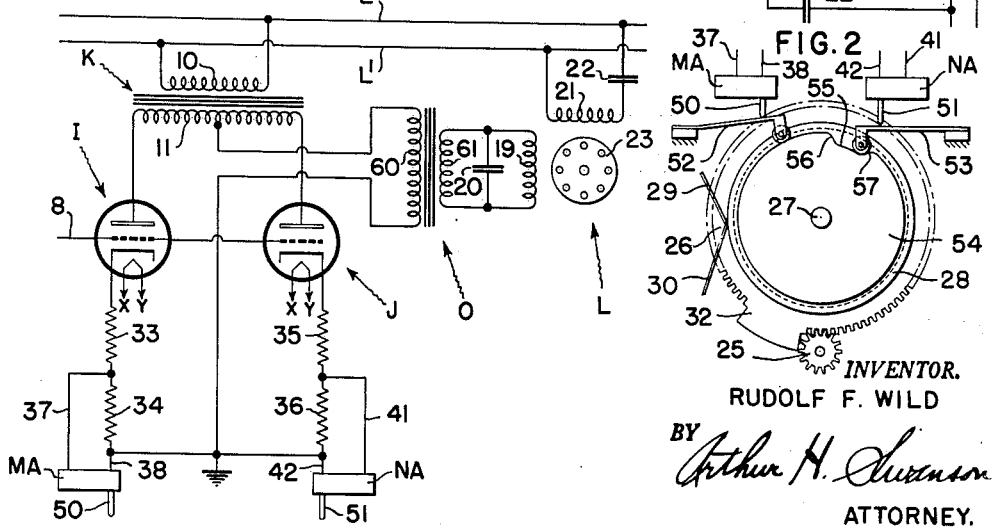
INVENTOR.
RUDOLF F. WILD
BY Arthur H. Swanson
ATTORNEY.

Patented Mar. 31, 1953

2,633,558

UNITED STATES PATENT OFFICE 2,633,558

ELECTRONIC MOTOR CONTROL APPARATUS

Rudolf F. Wild, Wilmington, Del., assignor, by mesne assignments, to Minneapolis-Honeywell Regulator Company, Minneapolis, Minn., a corporation of Delaware Application August 31, 1948, Serial No. 47,023

2 Claims. (Cl. 318—28)

The present invention relates to self-balancing measuring apparatus of the general type of the potentiometer recorder disclosed in the Wills Patent 2,423,540 of July 8, 1947. Said potentiometer recorder includes a slider contact which engages a potentiometric slide wire resistor, and also includes a recording element and a reversible electric motor for simultaneously adjusting said contact and said element along their respective paths of reciprocatory movement. In the operation of said recorder, a change in the value of the quantity measured unbalances the measuring system and thereby causes the motor to be actuated for movement varying in magnitude and direction with the magnitude and direction of the change so as to rebalance said system. The controlling means through which the motor is thus actuated comprises means for creating and amplifying an alternating current signal of a magnitude depending on the magnitude of the change, and of a phase which is in one direction, or in the opposite direction, depending on the direction of change in the quantity measured. The signal thus created and amplified is impressed on the control grid of each of two electronic power amplifying valves. Each of said valves is supplied with anode voltage which is 180° out of phase with the anode voltage supplied to the other valve, and which is in phase with, or 180° out of phase with, the amplified signal. The motor is energized for operation in one direction when the amplified signal is in phase with the anode voltage of one valve, and is energized for operation in the other direction when the signal is in phase with the anode voltage of the other valve.

Self-balancing potentiometers of the type disclosed in said Wills patent are in extensive and successful use, but as heretofore constructed and arranged they are open to the objection that when the range of variation in the quantity measured exceeds the operating range of measurement, the driving motor tends to move the slider contact and recording element beyond their respective limits of movement. When this occurs, the motor stalls without effecting serious or immediate injury, but the stalling of the motor under such circumstances tends to produce unnecessary wear, and to create objectionable noise.

The primary object of the present invention is to provide a relatively simple and inexpensive modification in self-balancing measuring apparatus of the type disclosed in the aforementioned Wills patent, which will in effect desensitize the motor and thereby reduce the torque of the motor, as the instrument mechanism reciprocated by the motor approaches either end position or limit of travel, without correspondingly desensitizing or slowing down the movement of the motor in the direction in which it moves said mechanism away from either end position whenever the need for the last mentioned movement occurs. A more specific object of the invention is to provide simple and effective means for modifying the cathode bias resistance associated with a respective one of the power amplifying valves as the mechanism adjusted by the motor approaches the limit of its movement in the direction in which it is moved when the anode voltage of that valve is in phase with the motor control signal.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Of the drawings:

Fig. 1 is a diagram illustrating the arrangement and operation of a self-balancing potentiometer recorder instrument;

Fig. 2 is a view illustrating a modification of the switch mechanism shown in Fig. 1; and Fig. 3 illustrates a modified form of a portion of the circuit shown in Fig. 1.

In Fig. 1, I have diagrammatically illustrated the motor control system of a self-balancing potentiometer of the type disclosed in said Wills patent together with the changes needed to provide desensitizing of the motor, in accordance with the present invention, as the instrument pen carriage and the potentiometer slider contact approach either end of their paths of movement. The apparatus illustrated diagrammatically in Fig. 1 comprises a measuring bridge circuit A including a slide wire resistor B and a slider contact C, the latter being mounted on a pen carriage D which is movable back and forth along a guideway D'. The carriage D also carries a stylus or pen $D^2$ which is operative to trace a record on a strip chart $D^3$ in accordance with variations in the voltage of a thermocouple E. In the balanced condition of the apparatus shown in Fig. 1, the voltage of the thermocouple E is equal in magnitude and opposite in direction to the unidirectional potential difference between the slider contact C and a fixed point F in the bridge circuit A.

On a change in thermocouple voltage, a converter mechanism G, which is energized, as hereinafter explained, by alternating current supplied by supply conductors L' and L², operates to create an alternating current signal proportional in magnitude to the unbalanced unidirectional voltage in the measuring circuit branch which includes the thermocouple E, the slider contact C, and the bridge point F. The alternating current signal thus produced by the converter G is of the same frequency as the voltage across the supply conductors L' and L², and is in phase with, or is 180° out of phase with the last mentioned voltage, depending on the direction of thermocouple voltage change. The alternating current signal produced by the converter G is amplified by a multi-stage electronic voltage amplifying system H, and the amplified output signal of the amplifier H is impressed on the control grid of each of two power amplifier valves I and J. The valves I and J, the converter G, and the voltage amplifier H are energized by currents supplied by the secondary windings of a transformer K. The current flow in the anode circuits of the valves I and J controls the energization and direction of rotation of a reversible rebalancing motor L, which by its operation adjusts the pen carriage D along the guideway D', and thereby adjusts the slider contact C along the slide wire resistor B.

The measuring bridge A, shown in Fig. 1, is of conventional type, comprising an energizing branch 1 and two resistance branches 2 and 3, all of which are connected in parallel with each other. The energizing branch 1 ordinarily includes a dry cell and a variable resistor. The slide wire resistor is in shunt with a portion of the resistance in the branch 2. The fixed bridge point F is in the branch 3 between the two resistance sections of that branch. The contact C is connected by a collector bar C' and a conductor 4 to one terminal of the thermocouple E. The second terminal of the thermocouple E is connected to the bridge point F through conductors included in the converter G, and by conductors 5 and 6. The output terminals of the converter G are connected by conductors 7 to the input terminals of the voltage amplifier H. One output terminal 8 of the amplifier H is connected to the control grid of each of the valves I and J. The second output terminal of the amplifier H is connected to ground by a conductor 9.

The primary winding 10 of the transformer K is connected across the supply conductors L' and L². The transformer K has three secondary windings 11, 12 and 13. One of the end terminals of the secondary winding 11 is connected by a conductor 14 to the anode of the valve I, and the other end terminal of the winding 11 is connected to the anode of the valve J by a conductor 14'. The secondary winding 12 has its terminals connected by conductors 15 to the energizing terminals of the voltage amplifier H to thereby energize a rectifier, included in the amplifier H, which supplies anode voltage to the voltage amplifier valves included in the said amplifier. The third transformer secondary winding 13 has terminal conductors 16 connected to the cathode heaters of the electronic valves included in the amplifier H, and has terminal conductors 17 connected to the energizing coil of a vibrator or circuit interrupter included in the converter G. Branches 16' from the terminal conductors 16 may supply heating current to the cathode heaters of the valves I and J through conductor connections X and Y which are only partially shown in order to avoid drawing complexity. The winding 13 has a center tap which is connected to ground.

The secondary winding 11 has a center tap connection 18 which is connected to ground through a control winding 19 of the motor L. A tuning condenser 20 is connected in parallel with the winding 19. In addition to its control winding 19, the motor L has a power winding 21 having one terminal directly connected to the supply conductor L², and having its second terminal connected to the supply conductor L' through a condenser 22. The motor L has a rotor 23 which is rotated when the current flow through the control winding 19 cooperates with the power winding 21 to create a rotating magnetic field in the motor.

With the motor windings arranged as shown, the current flow through the power winding 21 will be of the same frequency as the alternating voltage between the supply lines L' and L², and will be in phase with said voltage due to the action of the condenser 22. As is fully explained in said Wills patent, when the measuring system is unbalanced, there will be a current flow through the control winding 19 which is of the same frequency as the voltage between the supply lines L' and L², and which either leads or lags that voltage by 90°, according to the direction of measuring circuit unbalance and to the direction of current flow through the thermocouple E. The windings 19 and 21 thus cooperate to create a magnetic field which revolves in one direction or in the opposite direction, depending on the direction of measuring circuit unbalance.

The means diagrammatically shown in Fig. 1 through which the rotation of the rotor 23 adjusts the contact C along the slide wire B comprises a rotating structure including a gear wheel 26 in mesh with a spur gear 25 which is secured to the shaft 24 of the rotor 23. A pulley or cable drum 28 is secured to the shaft 27 of the gear 26 and operates through a flexible cable, having portions 29 and 30, to adjust the pen carriage D along the guideway D'. As shown, the cable portion 29 passes from the cable drum 28 over an idler pulley 31 and then to the carriage D which is connected to each of the cable portions 29 and 30. The cable portion 30 extends over three idler pulleys 31. The pulleys 31 are so arranged that the portions of the cable directly adjacent the carriage D extend away from the opposite sides of the latter in substantial parallelism with the guideway D'. With the arrangement shown and described, the rotation of the shaft 27 in the clockwise direction moves the pen carriage D, and thereby the slider contact C, to the left in Fig. 1, while counter-clockwise movements of the shaft 27 move the carriage and contact to the right. As diagrammatically shown, the limits of the range of reciprocatory movement of the carriage D and contact C are fixed by the engagement of one side or the other of the spur gear 25 by a projection 32 on the periphery of the gear 26. As diagrammatically shown, the gear 26 may oscillate through an angle of about 300°.

An apparatus of the type shown in the Wills patent as heretofore constructed customarily included a single cathode bias resistor through which the cathodes of the two valves, corresponding to the valves I and J hereof, were connected to ground. In accordance with the present invention, the cathodes of the two valves are separately and adjustably connected to ground. Thus, as shown, the cathode of the valve I is connected to ground by series connected resistors 33 and 34 which are in series with one another, and the cathode of the valve J is connected to ground by series connected resistors 35 and 36. As shown in Fig. 1, the resistor 34 may be short circuited, and the sensitivity of the valve I thereby increased, by means comprising conductors 37 and 38 which respectively connect the opposite ends of the resistor 34 to the blades 39 and 40 of a switch M. The blades 39 and 40 are shown biased for movement into engagement with one another, but as hereinafter explained, the blade 40 is moved out of engagement with the blade 39 as the carriage D approaches the left-hand limit of its movement during a period of operation in which it moves as a result of the amplified signal being in phase with the anode voltage of the valve I. Similar means are provided for un-short circuiting the bias resistor 36 of the valve J when the pen carriage D approaches the limit of its movement to the right. Thus, as shown, the ends of the resistor 36 are connected by conductors 41 and 42 to the blades 43 and 44 of a short circuiting switch N. The blades 43 and 44 are biased for movement into engagement with one another but are disengaged to decrease the sensitivity of the valve J as the carriage D is moved near to the right-hand limit of its range of movement.

As diagrammatically shown in Fig. 1, the switch M is opened, as the carriage D approaches the left-hand end of its range of movement, by a pin 45 carried by the cable drum 28, and the same pin 45 opens the switch N as the carriage D approaches the right-hand end of its range of movement. To permit operation of the switches M and N on appropriate movements of the gear 26 and pen carriage D, the path of movement of the pin 45 and the disposition of the switches M and N must be suitably related. In the particular arrangement shown, the switch blades 40 and 44 extend in general radial directions away from the shaft 27 and have their inner ends extending across the ends of the arc through which the pin 45 may move. With the arrangement shown, as the cable drum 28 is rotated clockwise into the position in which the pen carriage D is close to the left-hand end of its range of movement, the pin or projection 45 moves into the position indicated by the dotted circle 45'. In this position, the pin engages the blade 40 and holds it out of contact with the blade 39, thus opening the normally existing short circuit about the resistor 34 and thereby desensitizing the valve I.

When the drum 28 is turned counter-clockwise far enough to move the carriage D close to the right-hand end of its range of movement, the pin or projection 45 moves into its dotted line position 45" in which it engages the spring blade 44 and holds it out of contact with the blade 43 of the switch N. As a result, the normally existing short circuit across the resistor 36 is opened, and the valve J is thereby desensitized.

The effect of thus opening the short circuit about the resistor 34 is to increase the potential difference between the cathode of the valve I and ground, and thus make the cathode of the valve I more positive relative to the control grid of the valve than it is when the resistor 34 is short circuited. The magnitude of the control current supplied to the control winding 19 of the motor L is thus reduced, and the motor torque and speed are correspondingly reduced as the carriage D approaches closely to the left-hand end of its range of movement.

The opening of the switch N operates to increase the cathode potential, relative to the grid potential, of the valve J which is then being made conductive by the control signal, and this positive increase in cathode potential decreases the conductivity of that valve and thereby reduces the motor torque and speed which tends to drive the carriage D to the right.

The reduction in the conductivity of the valve I as the pen carriage D moves into proximity with the left-hand end of its range of movement desensitizes the motor L in the sense that it decreases the clockwise torque which the motor can then impress on the drum 28, and thus reduces the contact pressure between the projection 32 and the stop formed by the gear 25. Such a contact pressure is produced when the projection 32 is in the position indicated by the dotted lines 32', wherein it limits the range of pen carriage movement to the left. Such reduction in the conductivity of the valve I is not attended by a reduction in the conductivity of the valve J. In consequence, the full motor torque is available for movement of the pen carriage toward the right when a change in the voltage of the thermocouple E makes such movement appropriate. Similarly, a movement of the pen carriage D far enough to the right to bring the projection 32 into the position indicated by the dotted lines 32" adjacent the left-hand side of the gear 25 results in a reduction in the torque of the motor, without a corresponding reduction in the motor torque available to move the pen carriage to the left on a reduction in the voltage of the thermocouple E.

The form and disposition of the short circuiting switches and the means for giving them their adjustments may vary widely. Thus, by way of example, the switches M and N shown in Fig. 1 may be replaced by the normally closed switches MA and NA, respectively, of the well known Microswitch form as shown in Fig. 2. In Fig. 2, the switches MA and NA include actuating plunger elements 50 and 51, respectively. Said plungers are biased to their respective switch-opening positions, but the plungers 50 and 51 are held in their switch-closing positions by switch actuating members 52 and 53, respectively, except when the carriage D is adjacent one or the other of the limits of its range of movement. Thus, for the position of the gear 26 shown in Fig. 2, the switch actuating member 52 is deflected into the position in which it engages the plunger 50 and holds the latter in position to close the switch MA, and the switch actuating arm 53 is in the position in which it permits the operating plunger 51 of the switch NA to move into its switch-opening position.

In the arrangement of Fig. 2, the members 52 and 53 are adjusted between their switch opening and switch closing positions by an edge cam 54 carried by the shaft 27. The cam 54 is formed with a peripheral notch 55 which is so shaped and disposed, relative to the switch actuating arms 52 and 53, that as the shaft 27 rotates counter-clockwise into the position in which the projection 32 of the gear 26 occupies its full line position in close proximity to the left-hand side of the gear 25, the ball or roller carried by the free end of the switch actuating arm 53 can enter the notch 55 so that the arm 53 can permit the switch actuating plunger 51 to move into its switch-open position. A small clockwise rotation of the cam 54, away from its position shown in Fig. 2, causes the left-hand end wall 56 of the notch 55 to raise the free end of the arm 53 away from the axis of the cam 54, and thus to move the plunger 51 of the switch NA into its normally closed position. Further clockwise movement of the cam 54 will eventually bring the projection 32 into proximity with the right-hand side of the gear 25. As the projection 32 moves into this position, the free end of the arm 52 drops into the portion of the slot 55 adjacent the shoulder 57 and thus permits the switch MA to open and reduce the sensitivity of the valve I.

For the purposes of the present invention, the energization of the motor control winding 19 should result from current flow through one of the valves I and J when the system is unbalanced in one direction and should result from current flow through the other valve when the system unbalance is in the opposite direction. It is not essential, however, that the control winding 19 be directly included in the anode circuits of the two valves as it is in the arrangement shown in Fig. 1, and ordinarily preferred. Thus, for example, the winding 19 may be coupled to the anode circuits of the valves I and J by a transformer O, as shown in Fig. 3. The transformer O has one terminal of its primary winding 60 connected to the midpoint of the secondary winding 11 of the transformer K, and has its second terminal connected to the cathode of the valve I through the resistors 33 and 34 and to the cathode of the valve J through the resistors 35 and 36. The secondary winding 61 of the transformer O has its terminals directly connected to the terminals of the control winding 19 of the motor L.

In the arrangement shown in Fig. 3, the control signal transmitted to the control grids of the valves I and J may be produced and varied exactly as in the arrangement shown in Fig. 1. When the signal is of a character making the valve I conductive, the pulsating current flow through that valve will act through the transformer O to energize the winding 19 as required for the needed rebalancing function of the measuring system. Similarly, when the signal is of a character to make the valve J conductive, the transformer O energizes the winding 19 to effect rotation of the rebalancing motor in the direction then required. As shown in Fig. 3, the terminals of the resistors 34 and 36 are respectively connected to short circuiting switches MA and NA which may be similar in construction and in their actuating means to the switches MA and NA shown in Fig. 2. As will be apparent, however, the switches MA and NA of Fig. 3 may be replaced by switches similar in form and mode of actuation to the switches M and N shown in Fig. 1.

While the resistance values of the cathode resistors are not highly critical, the desensitizing resistors 34 and 36 should have resistance values substantially greater than the resistance values of the resistors 33 and 35. For example, in one embodiment of the invention in which the frequency of the energizing voltage is 60 cycles per second, the resistance of each of the resistors 33 and 35 is 150 ohms, and the resistance of each of the resistors 34 and 36 is 2200 ohms. In another embodiment of the invention in which the frequency of the energizing voltage is 25 cycles per second, the resistance of each of the resistors 33 and 35 is 300 ohms, and the resistance of each of the resistors 34 and 36 is 1000 ohms.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims, and that in some cases certain features of my invention may be used to advantage without a corresponding use of other features.

Having now described my invention, what I claim as new and desire to secure by Letters Patent, is:

1. In self-balancing measuring apparatus including a rebalancing device having a member movable through a range of adjustment having predetermined mechanical limits, the movement of said member to a rebalancing position within said range being operative to rebalance the apparatus when the latter becomes unbalanced, a rebalancing mechanism for moving said member including a reversible alternating current rebalancing motor and drive means connected between said member and said motor and operative to cause operation of the latter to move said member within said range in a direction corresponding to the direction of motor operation, said motor having a rotor coupled to said drive means and having a control winding and a power winding, motor control means including two electronic valves, each having a separate anode, control grid, and cathode, a transformer having a primary winding and a center-tapped secondary winding, energizing means adapted to connect said primary winding to a source of alternating current of predetermined frequency, a separate connection between each of said anodes and a respective end terminal of said secondary winding, a separate cathode bias resistor having a finite resistance value connected between each of said cathodes and one terminal of said motor control winding, and a connection between the other terminal of the latter and the center-tap connection of said secondary winding, means responsive to unbalance of the apparatus for impressing between the control grid and cathode of each of said valves an alternating current signal of said predetermined frequency which is in phase with the voltage supplied by said secondary winding to one or the other of said valves accordingly as the unbalance is in one direction or the other, whereby said signal effects an increase in the conductivity of one of said valves and a decrease in the conductivity of the other of said valves for apparatus unbalance in one direction and effects a decrease in the conductivity of said one valve and an increase in the conductivity of said other valve for apparatus unbalance in the opposite direction, and means connecting said motor power winding to said energizing means, whereby said signal effects rotation of said motor rotor and movement of said member in said one direction or in said opposite direction accordingly as said one or said other valve has its conductivity increased by said signal, the improvement comprising a part rotated by said drive means in a direction corresponding to the direction of movement of said member and through no greater than one revolution as said member is moved throughout said range from one of said limits to the other, a pin carried on the face of said part, switch means cooperating with said pin to effect the selective desensitization of said rebalancing mechanism, said switch means comprising a first normally closed switch portion having a relatively stationary contact and a cooperating relatively movable contact which is maintained in contact with said stationary contact whenever said member is substantially away from one of said limits and which is moved by said pin out of contact with said stationary contact whenever said member is moved to any position within a predetermined relatively small distance from said one of said limits, said switch means also comprising a second normally closed switch portion having a relatively stationary contact and a cooperating relatively movable contact which is maintained in contact with the last mentioned stationary contact whenever said member is substantially away from the other of said limits and which is moved by said pin out of contact with said last mentioned stationary contact whenever said member is moved to any position to within a predetermined, relatively small distance from said other of said limits, means connecting the contacts of said first switch portion across at least a substantial portion of the cathode bias resistor connected to said one of said valves, and means connecting the contacts of said second switch portion across at least a portion of the cathode bias resistor connected to said other of said valves.

2. In self-balancing measuring apparatus including a rebalancing device having a member movable through a range of adjustment having predetermined mechanical limits, the movement of said member to a rebalancing position within said range being operative to rebalance the apparatus when the latter becomes unbalanced, a rebalancing mechanism for moving said member including a reversible alternating current rebalancing motor and drive means connected between said member and said motor and operative to cause operation of the latter to move said member within said range in a direction corresponding to the direction of motor operation, said motor having a rotor coupled to said drive means and having a control winding and a power winding, motor control means including two electronic valves, each having a separate anode, control grid, and cathode, a transformer having a primary winding and a center-tapped secondary winding, energizing means adapted to connect said primary winding to a source of alternating current of predetermined frequency, a separate connection between each of said anodes and a respective end terminal of said secondary winding, a separate cathode bias resistor having a finite resistance value connected between each of said cathodes and one terminal of said motor control winding, and a connection between the other terminal of the latter and the center-tap connection of said secondary winding, means responsive to unbalance of the apparatus for impressing between the control grid and cathode of each of said valves an alternating current signal of said predetermined frequency which is in phase with the voltage supplied by said secondary winding to one or the other of said valves accordingly as the unbalance is in one direction or the other, whereby said signal effects an increase in the conductivity of one of said valves and a decrease in the conductivity of the other of said valves for apparatus unbalance in one direction and effects a decrease in the conductivity of said one valve and an increase in the conductivity of said other valve for apparatus unbalance in the opposite direction, and means connecting said motor power winding to said energizing means, whereby said signal effects rotation of said motor rotor and movement of said member in said one direction or in said opposite direction accordingly as said one or said other valve has its conductivity increased by said signal, the improvement comprising a cam rotated by said drive means in a direction corresponding to the direction of movement of said member and through no greater than one revolution as said member is moved throughout said range from one of said limits to the other, a depression on the periphery of said cam, switch means cooperating with said cam to effect the selective desensitization of said rebalancing mechanism, said switch means comprising a first normally closed switch portion having a relatively stationary contact and a cooperating relatively movable contact provided with a roller follower which is maintained in contact with the periphery of said cam and which maintains said contacts in engagement whenever said member is substantially away from one of said limits, said cam depression being operative to receive said roller and to effect the separation of said contacts whenever said member is moved to any position within a predetermined, relatively small distance from said one of said limits, said switch means also comprising a second normally closed switch portion having a relatively stationary contact and a cooperating relatively movable contact provided with a roller follower which is maintained in contact with the periphery of said cam and which maintains the last mentioned two contacts in engagement whenever said member is substantially away from the other of said limits, said cam depression being operative to receive the last mentioned roller and to effect the separation of said last mentioned two contacts whenever said member is moved to any position within a predetermined, relatively small distance from said other of said limits, means connecting the contacts of said first switch portion across at least a substantial portion of the cathode bias resistor connected to said one of said valves, and means connecting the contacts of said second switch portion across at least a substantial portion of the cathode bias resistor connected to said other of said valves.

RUDOLF F. WILD.

REFERENCES CITED

The following references are of record in the file of this patent:

UNITED STATES PATENTS

| Number | Name | Date |
| --- | --- | --- |
| 1,687,501 | Liddiard | Oct. 16, 1928 |
| 2,376,513 | Shaffer | May 22, 1945 |